United States Patent
Yang

(10) Patent No.: US 12,477,646 B1
(45) Date of Patent: Nov. 18, 2025

(54) OVERLOAD WARNING AND PROTECTION DEVICE AND METHOD AND LIGHTING CONTROL SYSTEM

(71) Applicant: SMART ELECTRIC WORKS CO., LTD., Chang Hua Hsien (TW)

(72) Inventor: Jerry Yang, Taichung (TW)

(73) Assignee: Smart Electric Works Co., Ltd., Chang Hua Hsien (TW)

( * ) Notice: Subject to any disclaimer, the term of this patent is extended or adjusted under 35 U.S.C. 154(b) by 36 days.

(21) Appl. No.: 18/667,976

(22) Filed: May 17, 2024

(51) Int. Cl.
*H05B 45/37* (2020.01)
*H05B 47/25* (2020.01)

(52) U.S. Cl.
CPC .................. *H05B 47/25* (2020.01)

(58) Field of Classification Search
CPC ........ H05B 45/34; H05B 45/37; H05B 45/46; H05B 45/345; H05B 45/355; H05B 45/375; H05B 45/385; H05B 45/3725; H05B 47/16; H05B 47/25
See application file for complete search history.

(56) References Cited

U.S. PATENT DOCUMENTS

| | | | | |
|---|---|---|---|---|
| 9,531,278 | B2* | 12/2016 | Zhang | H02M 3/33507 |
| 9,780,672 | B1* | 10/2017 | Li | H05B 45/3725 |
| 2010/0026208 | A1* | 2/2010 | Shteynberg | H05B 45/3725 315/297 |
| 2021/0204375 | A1* | 7/2021 | Li | H05B 47/17 |
| 2021/0410245 | A1* | 12/2021 | Li | H05B 45/3575 |
| 2022/0418062 | A1* | 12/2022 | Chen | H05B 45/14 |
| 2024/0276621 | A1* | 8/2024 | Sugiyama | H05B 45/46 |

\* cited by examiner

*Primary Examiner* — Tung X Le
(74) *Attorney, Agent, or Firm* — Che-Yang Chen; Law Office of Michael Chen

(57) ABSTRACT

An overload warning and protection device suitable for a lighting control system including a power supply, a lighting device and a switching element is disclosed to include a current detection component and a control component. When the control component detects that the current is greater than the first threshold current and continues to exceed the first preset time, the control component periodically turns off and on the switching element, causing the lighting device to flash to remind the user. When the control component detects that the current is greater than the second threshold current, the control component permanently shuts down the switching element and cuts off the power supply for protection.

12 Claims, 4 Drawing Sheets

OVERLOAD WARNING AND PROTECTION DEVICE AND METHOD AND LIGHTING CONTROL SYSTEM

BACKGROUND OF THE INVENTION

1. Field of the Invention

The present invention relates to the technical field of lighting control, especially about an overload warning and protection device and overload warning and protection method suitable for lighting control systems.

2. Description of the Related Art

Generally, lighting fixtures, especially outdoor lighting fixtures, often have multiple lamps with different wattages connected to the same circuit, and because they are far away from the power control terminal, it is impossible to immediately alert that the upper limit of the circuit's rated current has been reached. And the lamps have different wattages, what wattage can be installed? How many lamps? It often troubles people who lack electrical knowledge.

SUMMARY OF THE INVENTION

The present invention specifically addresses the aforementioned problem and proposes a real-time warning system that allows consumers to know whether the rated load range has been exceeded without having to calculate the wattage themselves. Moreover, the flashing of all lamps is used to force the installation personnel to stop adding lamps, and the power supply is cut off within a certain percentage of overload to achieve an instant warning and ensure the safety of the system.

The present invention provides an overload warning and protection device suitable for a lighting control system. This lighting control system comprises a power supply, a lighting device and a switching element. The power supply supplies power to the lighting device through a power supply line, and the switching element is located on the power supply line. This overload warning and protection device comprises a current detection component and a control component. The current detection component is located on the power supply line and is suitable for detecting a current on the power supply line to generate a current detection signal. The control component is electrically coupled to the switching element and the current detection component, and is suitable for receiving the current detection signal and controlling the conduction state of the switching element according to the current detection signal. The control component is provided with a first threshold current, a second threshold current and a first preset time. The second threshold current is greater than the first threshold current. When the control component detects that the current is greater than the first threshold current and continues to exceed the first preset time according to the current detection signal, the control component periodically turns off and on the switching element. When the control component detects that the current is greater than the second threshold current based on the current detection signal, the control component permanently turns off the switching element.

The present invention also provides an overload warning and protection method, which is suitable for an overload warning and protection device. The overload warning and protection device is applied to a lighting control system. The lighting control system comprises a power supply, a lighting device and a switching element. The power supply supplies power to the lighting device through a power supply line. The switching element is located on the power supply line. The overload warning and protection device comprises a current detection component. This current detection component is located on the power supply line and is suitable for detecting a current on the power supply line to generate a current detection signal. The overload warning and protection method comprising the steps of: setting a first threshold current, a second threshold current and a first preset time, where the second threshold current is greater than the first threshold current; receiving the current detection signal to detect the current; periodically turning the switching element off and on when the current is greater than the first threshold current and continues to exceed the first preset time; and permanently turning off the switching element when the current is greater than the second threshold current.

The present invention also provides a lighting control system, which comprises a power supply, a lighting device to which the power supply supplies power through a power supply line, a switching element located on the power supply line, and an overload warning and protection device electrically coupled to the switching element. The overload warning and protection device comprises a current detection component located on the power supply line and adapted for detecting a current on the power supply line to generate a current detection signal, and a control component electrically coupled to the switching element and the current detection component. The control component is adapted to receive the current detection signal and control the conduction state of the switching element according to the current detection signal. The control component is provided with a first threshold current, a second threshold current and a first preset time. The second threshold current is greater than the first threshold current. When the control component detects that the current is greater than the first threshold current and continues to exceed the first preset time according to the current detection signal, the control component periodically turns off and on the switching element. When the control component detects that the current is greater than the second threshold current according to the current detection signal, the control component permanently turns off the switching element.

Through the overload warning and protection device and overload warning and protection methods provided in the present invention, an instantaneous lamp load overload early warning protection mechanism can be provided. After the power supply supplies power, the control component turns on the switching element and starts supplying power to the lighting device. When the current is greater than the first threshold current and continues to exceed the first preset time, the control component turns off the switching element and waits for a second preset time, and then controls the switching element to turn on. At this time, if the current is still greater than the first threshold current, the control component will repeat the aforementioned steps and turn off the switching element again. Such repeated operations can cause the switching element to be turned off and on periodically, thereby causing the lighting device to flash and emit light, thereby instantly reminding the installer or user of the overload problem. In addition, if the current does not decrease but continues to increase, when the current exceeds the second threshold current, the control component will permanently shut down the switching element until the power supply of the overload warning and protection device is turned off and on again, the switching element can be turned on again to make the lighting device emit light. In this way, it can be ensured that the lighting device will operate normally only when the current falls within its rated range. Otherwise, the lighting device will flash to remind the user and cut off the power supply for protection when the current is too large.

DETAILED DESCRIPTION OF THE INVENTION

Figure 1:
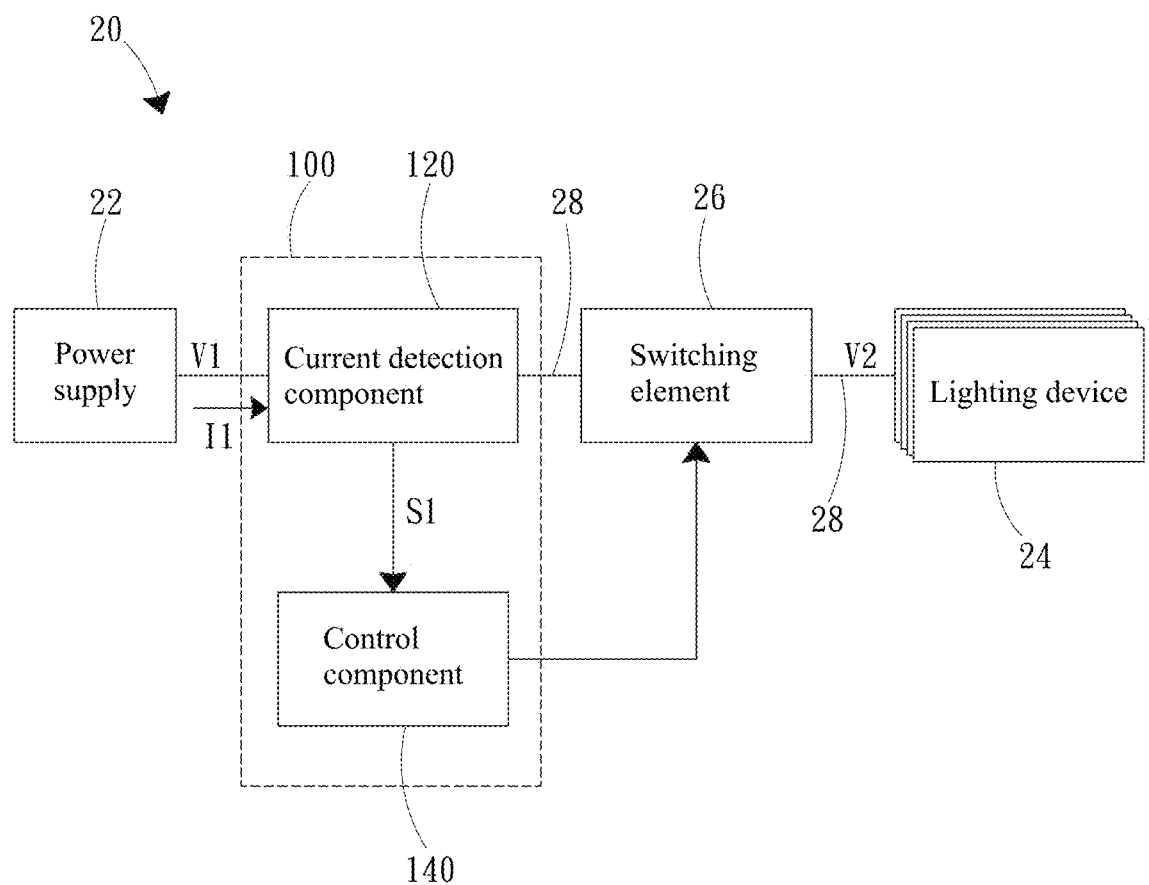
FIG. 1 is a block diagram of a lighting control system with overload warning and protection device provided according to an embodiment of the present invention.

FIG. 1 is a block diagram of a lighting control system 20 with an overload warning and protection device 100 provided according to an embodiment of the present invention.

As shown in the figure, this overload warning and protection device 100 is suitable for lighting control system 20 to avoid excessive current I1 causing equipment damage or endangering personnel safety.

The lighting control system 20 comprises a power supply 22, a lighting device 24, a switching element 26 and the aforementioned overload warning and protection device 100. The power supply 22 supplies power to the lighting device 24 through a power supply line 28. The switching element 26 is located on the power supply line 28. In one embodiment, the lighting device 24 may be an outdoor light or a Christmas light, and the lighting device 24 may include a plurality of lamps connected in series. In one embodiment, any switching element 26 that can be controlled electrically, such as a relay, a metal oxide semi-field effect transistor (MOSFET), an insulated gate bipolar transistor (IGBT), a TRIAC, or a silicon controlled rectifier (SCR) and other electronic components can be applied to the present invention.

The overload warning and protection device 100 comprises a current detection component 120 and a control component 140. The current detection component 120 is located on the power supply line 28 and is suitable for detecting the current I1 on the power supply line 28 to generate a current detection signal S1.

In one embodiment, the current detection component 120 may be a current detection resistor, a Hall current sensing element, or other devices suitable for detecting the current I1 and converting it to generate a voltage signal (that is, the current detection signal S1) for external interpretation.

The control component 140 is electrically coupled to the switching element 26 and the current detection component 120, and is adapted to receive the current detection signal S1 and control the conduction state of the switching element 26 according to the current detection signal S1.

Figure 2:
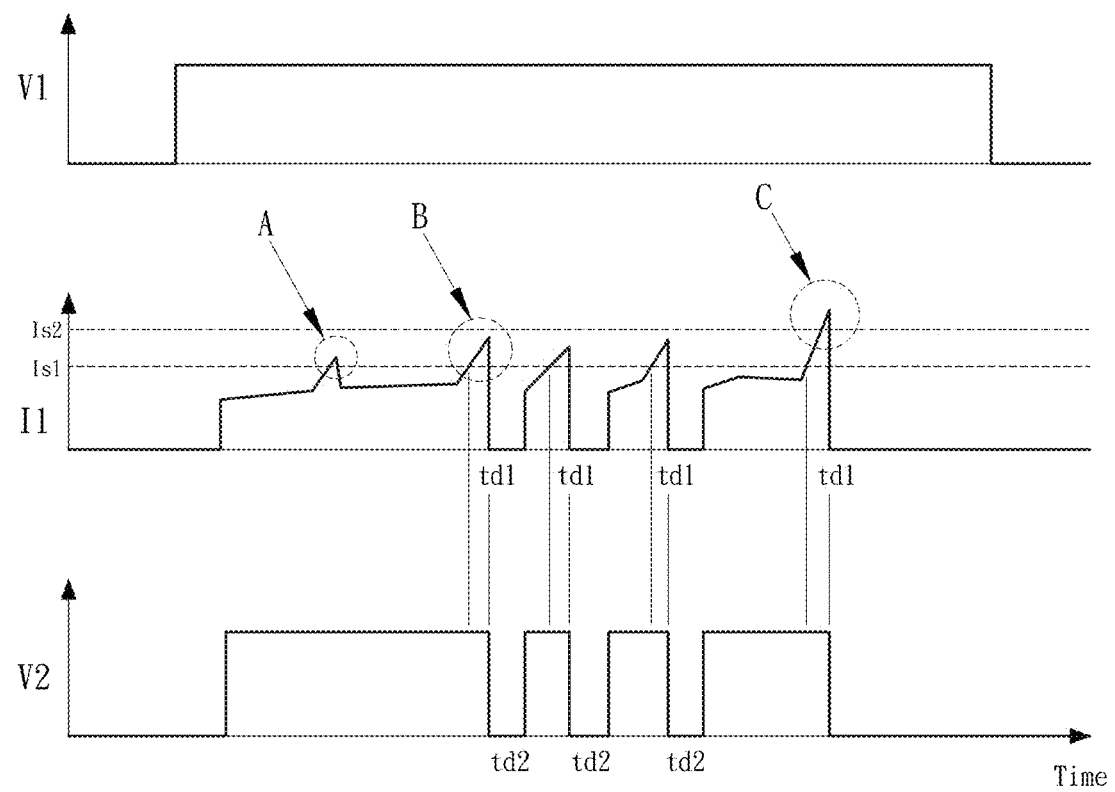
FIG. 2 uses a waveform diagram to show the corresponding relationship between the output voltage of the power supply, the current on the power supply line, and the input voltage of the lighting device.

Please also refer to FIG. 2. FIG. 2 uses a waveform diagram to show the corresponding relationship between the output voltage V1 of the power supply 22, the current I1 on the power supply line 28, and the input voltage V2 of the lighting device 24.

The control component 140 of this embodiment is provided with a first threshold current Is1, a second threshold current Is2, a first preset time td1 and a second preset time td2, wherein, the second threshold current Is2 is greater than the first threshold current Is1.

After the power supply 22 supplies power, the overload warning and protection device 100 obtains power, and the control component 140 turns on the switching element 26 to start supplying power to the lighting device 24.

When the control component 140 detects that the current I1 is greater than the first threshold current Is1 based on the current detection signal S1, the control component 140 will start timing a first preset time td1. If the current I1 detected by the current detection signal S1 drops below the first threshold current Is1 during the first preset time td1, the control component 140 will return to its original normal operating state (as indicated by arrow A in FIG. 2).

If the current I1 is greater than the first threshold current Is1 for more than a first preset time td1 (as indicated by arrow B in FIG. 2), the control component 140 will temporarily turn off the switching element 26 and wait for a second preset time td2. Then turn switching element 26 on again.

At this time, if the current I1 drops below the first threshold current Is1, the control component 140 will return to its original normal operating state. Next, if the current I1 exceeds the first threshold current Is1, the control component 140 will recalculate the first preset time td1.

On the contrary, if the current I1 is continuously or regularly greater than the first threshold current Is1, the control component 140 will periodically turn off and on the switching element 26 according to the first preset time td1 and the second preset time td2 (the working cycle of the switching element 26 will be close to the sum of the first preset time td1 and the second preset time td2), thereby causing the lighting device 24 to flash and emit light to remind the user that the lighting control system 20 is in an overload (overcurrent) state.

In order to ensure that the user can clearly confirm that the lighting device 24 generates flickering light, in a preferred embodiment, the first preset time td1 and the second preset time td2 are preferably between 0.3 seconds and 0.5 seconds, but are not limited to this. In addition, for a preferred embodiment, the first preset time td1 can be set equal to the second preset time td2.

If the current I1 is greater than the first threshold current Is1 and then continues to rise, this means that the aforementioned periodic turning off of the switching element 26 fails to effectively reduce the current I1. At this time, when the control component 140 detects that the current I1 is greater than the second threshold current Is2 according to the current detection signal S1, the control component 140 will permanently turn off the switching element 26. That is to say, the control component 140 will stop controlling the switching element 26 after turning off the switching element 26. Until the system power supply (including the power supply of the overload warning and protection device 100) is turned off and on again, the control component 140 will turn on the switching element 26 again, causing the lighting device 24 to light up again.

In one embodiment, when the control component 140 detects that the current I1 is greater than the second threshold current Is2 according to the current detection signal S1, the control component 140 can enter a disable state after turning off the switching element 26. At this time, the control component 140 must be restarted by an external input enable signal in order to turn on the switching element 26 and enable the power supply 22 to supply power to the lighting device 24.

In one embodiment, the control component 140 may be a microcontroller (MCU). The microcontroller can execute the judgment and control procedures through the built-in input and output terminals (I/O), analog-to-digital converter (ADC), timer (Timer), pulse width modulation control (PWM) and other functions as well as its built-in memory. However, the invention is not limited to this.

If an analogy method is used for comparison and judgment, the control component 140 can set a first threshold voltage and a second threshold voltage. The first threshold voltage corresponds to the first threshold current Is1, and the second threshold voltage corresponds to the second threshold current Is2. The control component 140 compares the current detection signal S1 with the first threshold voltage to determine whether the current I1 is greater than the first threshold current Is1, and compares the current detection signal S1 with the second threshold voltage to determine whether the current I1 is greater than the second threshold current Is2.

Specifically, if the current detection signal S1 is greater than the first threshold voltage, the control component 140 immediately generates a timing start signal to trigger the timer to start timing. If the potential of the current detection signal S1 drops below the first threshold voltage within the first preset time td1 after the timing starts, the control component 140 will reset the timer and return to the original normal operating state.

On the contrary, if the potential of the current detection signal S1 is always higher than the first threshold voltage, when the first preset time td1 is calculated, the timer will generate a trigger signal to notify the control component 140 to turn off the switching element 26, and at the same time reset and recalculate the time. When the second preset time td2 is calculated, another trigger signal is generated to notify the control component 140 to turn on the switching element 26 again. In this way, the switching element 26 can be turned off and on periodically, thereby causing the lighting device 24 to flash and emit light.

In addition, if the potential of the current detection signal S1 is greater than the second threshold voltage before the timer counts to the first preset time td1, the control component 140 immediately turns off the switching element 26 and enters the disabled state to stop controlling the switching element 26.

If a digital method is used for comparison and judgment, the control component 140 can preset a first threshold and a second threshold, corresponding to the first threshold current Is1 and the second threshold current Is2 respectively. Subsequently, the control unit can use an analog-to-digital converter to convert the current detection signal S1 into a numerical value, and compare this numerical value with the first threshold and the second threshold to determine whether the current I1 is greater than the first threshold current Is1 or even greater than the second threshold current Is2.

In practical applications, the aforementioned power supply 22, switching element 26 and overload warning and protection device 100 can be installed indoors and electrically coupled to the lighting device 24 installed outdoors through the power supply line 28. In this way, even if the user is indoors, he or she can detect the risk of overload in the lighting control system 20 through the flashing light of the lighting device 24.

Figure 3:
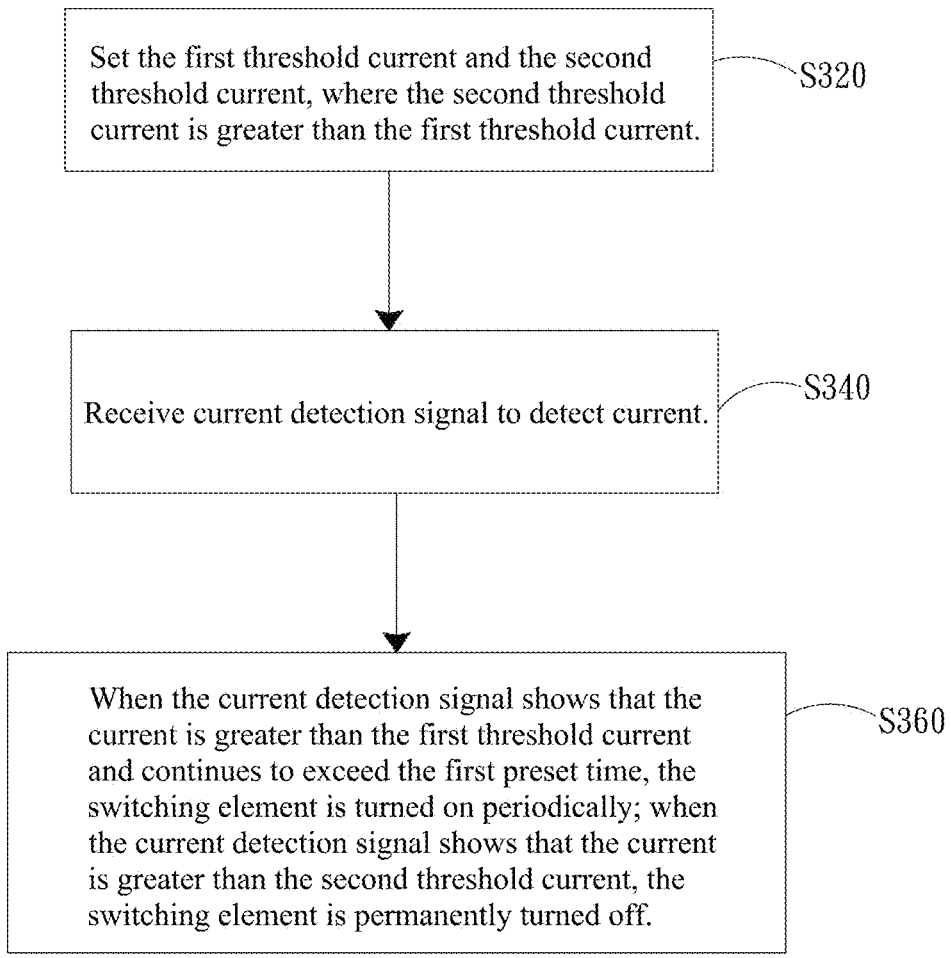
FIG. 3 is a flow chart of the overload warning and protection method provided according to an embodiment of the present invention.

FIG. 3 is a flow chart of the overload warning and protection method provided according to an embodiment of the present invention.

This present invention also provides an overload warning and protection method, which is suitable for the overload warning and protection device 100 shown in FIG. 1. This overload warning and protection device is suitable for a lighting control system 20. The lighting control system 20 comprises a power supply 22, a lighting device 24 and a switching element 26. The power supply 22 supplies power to the lighting device 24 through a power supply line 28. Switching element 26 is located on the power supply line 28. The overload warning and protection device 100 comprises a current detection component 120 and a control component 140. The current detection component 120 is electrically coupled to the power supply line 28 and is suitable for detecting the current I1 on the power supply line 28 to generate a current detection signal S1.

The overload warning and protection method in this embodiment comprises the following steps.

First, as described in step S320, set a first threshold current Is1 and a second threshold current Is2, where the second threshold current Is2 is greater than the first threshold current Is1. This step can be performed by control component 140. In one embodiment, the voltage level or value corresponding to the first threshold current Is1 and the second threshold current Is2 can be set in the control component 140 to facilitate subsequent comparison and judgment.

Subsequently, as described in step S340, the current detection signal S1 is received to detect the current I1. This step can be performed by the control component 140 through the current detection component 120.

Then, as described in step S360, when the current detection signal S1 shows that the current I1 is greater than the first threshold current Is1 and continues to exceed the first preset time td1, the switching element 26 is turned off and on periodically, and when the current detection signal S1 shows that the current I1 is greater than the second threshold current Is2, the switching element 26 is permanently turned off.

When the current detection signal S1 shows that the current I1 is greater than the second threshold current Is2, the control component 140 will permanently shut down the switching element 26, and the light cannot be turned on again until the power supply 22 of the system (including the overload warning and protection device 100) is turned off and on again. In this way, in addition to producing an immediate warning effect when the load current is high (exceeding the first threshold current Is1), it also helps to maintain the load current within the rated range. In addition, when the load current is too large (exceeding the second threshold current Is2), the current can also be cut off directly to avoid damage to the lighting control system 20.

Figure 4:
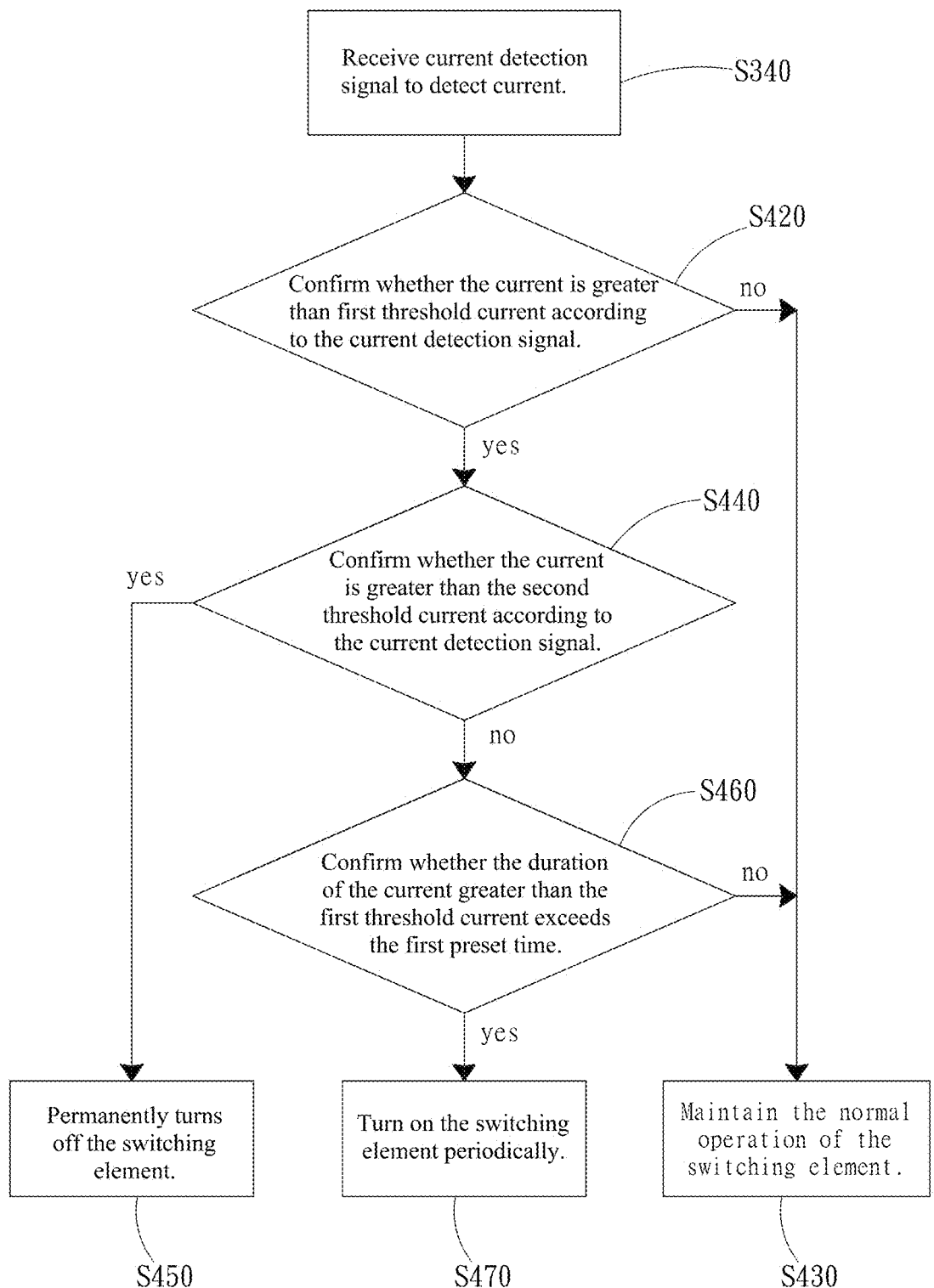
FIG. 4 shows an embodiment of step S360 of the overload warning and protection method shown in FIG. 3.

FIG. 4 shows an embodiment of step S360 of the overload warning and protection method shown in FIG. 3.

Following step S340, after receiving the current detection signal S1, as described in the judgment step S420, it is confirmed whether the current I1 is greater than the first threshold current Is1 based on the current detection signal S1.

When the current detection signal S1 shows that the current I1 is not greater than the first threshold current Is1, the process proceeds to step S430 to maintain the normal operation of the switching element 26. When the current detection signal S1 shows that the current I1 is greater than the first threshold current Is1, the process proceeds to judgment step S440.

In the judgment step S440, it is confirmed according to the current detection signal S1 whether the current I1 is greater than the second threshold current Is2. If the current detection signal S1 shows that the current I1 is greater than the second threshold current Is2, the process proceeds to step S450 to permanently turn off the switching element 26. On the contrary, if the current detection signal S1 shows that the current I1 is not greater than the second threshold current Is2, the process proceeds to the judgment step S460.

In the judgment step S460, it is confirmed whether the duration of the current I1 being greater than the first threshold current Is1 exceeds the first preset time td1. If so, the process proceeds to step S470 to periodically turn off and on the switching element 26. If not, the process proceeds to step S430 to maintain normal operation of the switching element 26.

Through the aforementioned process, when the current detection signal S1 shows that the current I1 is greater than the first threshold current Is1 and continues to exceed the first preset time td1, the switching element 26 is turned off and on periodically. In one embodiment, the aforementioned periodic turning off and turning on the switching element 26 may be to turn off the switching element 26 first, wait for the second preset time td2, and then turn on the switching element 26.

Through the overload warning and protection device 100 and the overload warning and protection method provided in the present invention, an instantaneous lamp load overload early warning protection mechanism can be provided. After the power supply 22 supplies power, the control component 140 turns on the switching element 26 and starts supplying power to the lighting device 24. When the current I1 is greater than the first threshold current Is1 and continues to exceed the first preset time td1, the control component 140 turns off the switching element 26 and waits for a second preset time td2, and then controls the switching element 26 to turn on. At this time, if the current I1 is still greater than the first threshold current Is1, the control component 140 will repeat the aforementioned steps and turn off the switching element 26 again. Such repeated operations can cause the switching element 26 to be turned off and on periodically, thereby causing the lighting device 24 to flash and emit light, thereby instantly reminding the installer or user of the overload problem. In addition, if the current I1 does not decrease but continues to increase, when the current I1 exceeds the second threshold current Is2, the control component 140 will permanently shut down the switching element 26 until the power supply of the overload warning and protection device 100 is turned off and on again, the switching element 26 can be turned on again to make the lighting device 24 emit light. In this way, it can be ensured that the lighting device 24 will operate normally only when the current falls within its rated range. Otherwise, the lighting device 24 will flash to remind the user and cut off the power supply for protection when the current I1 is too large.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An overload warning and protection device used in a lighting control system comprising a power supply, a lighting device and a switching element, said power supply supplying power to said lighting device through a power supply line, said switching element being located on said power supply line, said overload warning and protection device comprising:
   a current detection component located on said power supply line and adapted for detecting a current on said power supply line to generate a current detection signal; and
   a control component electrically coupled to said switching element and said current detection component, said control component being adapted to receive said current detection signal and control the conduction state of said switching element according to said current detection signal, said control component being provided with a first threshold current, a second threshold current and a first preset time;
   wherein when said control component detects that said current is greater than said first threshold current and continues to exceed said first preset time according to said current detection signal, said control component periodically turns off and on said switching element; when said control component detects that said current is greater than said second threshold current according to said current detection signal, said control component permanently turns off said switching element.

2. The overload warning and protection device as claimed in claim 1, wherein said lighting device is selectively an outdoor light or a Christmas light.

3. The overload warning and protection device as claimed in claim 1, wherein said control component is a microcontroller (MCU).

4. The overload warning and protection device as claimed in claim 1, wherein said control component is further provided with a second preset time, and said control component periodically turns off and on said switching element based on said first preset time and said second preset time.

5. The overload warning and protection device as claimed in claim 4, wherein said first preset time is equal to said second preset time.

6. The overload warning and protection device as claimed in claim 4, wherein when said control component detects that said current is greater than said first threshold current and continues to exceed said first preset time based on said current detection signal, said control component turns off said switching element and waits for said second preset time.

7. The overload warning and protection device as claimed in claim 1, wherein when said control component detects that said current is greater than said second threshold current according to said current detection signal, said control component turns off said switching element and enters a disabled state.

8. The overload warning and protection device as claimed in claim 1, wherein said current detection signal is a voltage signal.

9. The overload warning and protection device as claimed in claim 1, wherein said control component is provided with a first threshold voltage corresponding to said first threshold current and a second threshold voltage corresponding to said second threshold current, said control component comparing said current detection signal with said first threshold voltage to determine whether said current is greater than said first threshold current.

10. The overload warning and protection device as claimed in claim 1, wherein said control component is provided with an analog-to-digital converter for converting said current detection signal into a numerical value, and said control component judging whether said current is greater than said first threshold current based on said numerical value.

11. An overload warning and protection method, suitable for an overload warning and protection device used in a lighting control system comprising a power supply, a lighting device and a switching element, said power supply supplying power to said lighting device through a power supply line, said switching element being located on said power supply line, said overload warning and protection device comprising a current detection component, said current detection component being located on said power supply line and being adapted for detecting a current on said power supply line to generate a current detection signal, the overload warning and protection method comprising the steps of:

setting a first threshold current, a second threshold current and a first preset time, said second threshold current being greater than said first threshold current;

receiving said current detection signal to detect said current;

periodically turning said switching element off and on when said current is greater than said first threshold current and continues to exceed said first preset time; and permanently turning off said switching element when said current is greater than said second threshold current.

12. A lighting control system, comprising:

a power supply;

a lighting device to which said power supply supplies power through a power supply line;

a switching element located on said power supply line; and an overload warning and protection device electrically coupled to said switching element, said overload warning and protection device comprising a current detection component located on said power supply line and adapted for detecting a current on said power supply line to generate a current detection signal, and a control component electrically coupled to said switching element and said current detection component, said control component being adapted to receive said current detection signal and control the conduction state of said switching element according to said current detection signal, said control component being provided with a first threshold current, a second threshold current and a first preset time, said second threshold current being greater than said first threshold current;

wherein when said control component detects that said current is greater than said first threshold current and continues to exceed said first preset time according to said current detection signal, said control component periodically turns off and on said switching element; when said control component detects that said current is greater than said second threshold current according to said current detection signal, said control component permanently turns off said switching element.

\* \* \* \* \*